Patented Oct. 13, 1925.

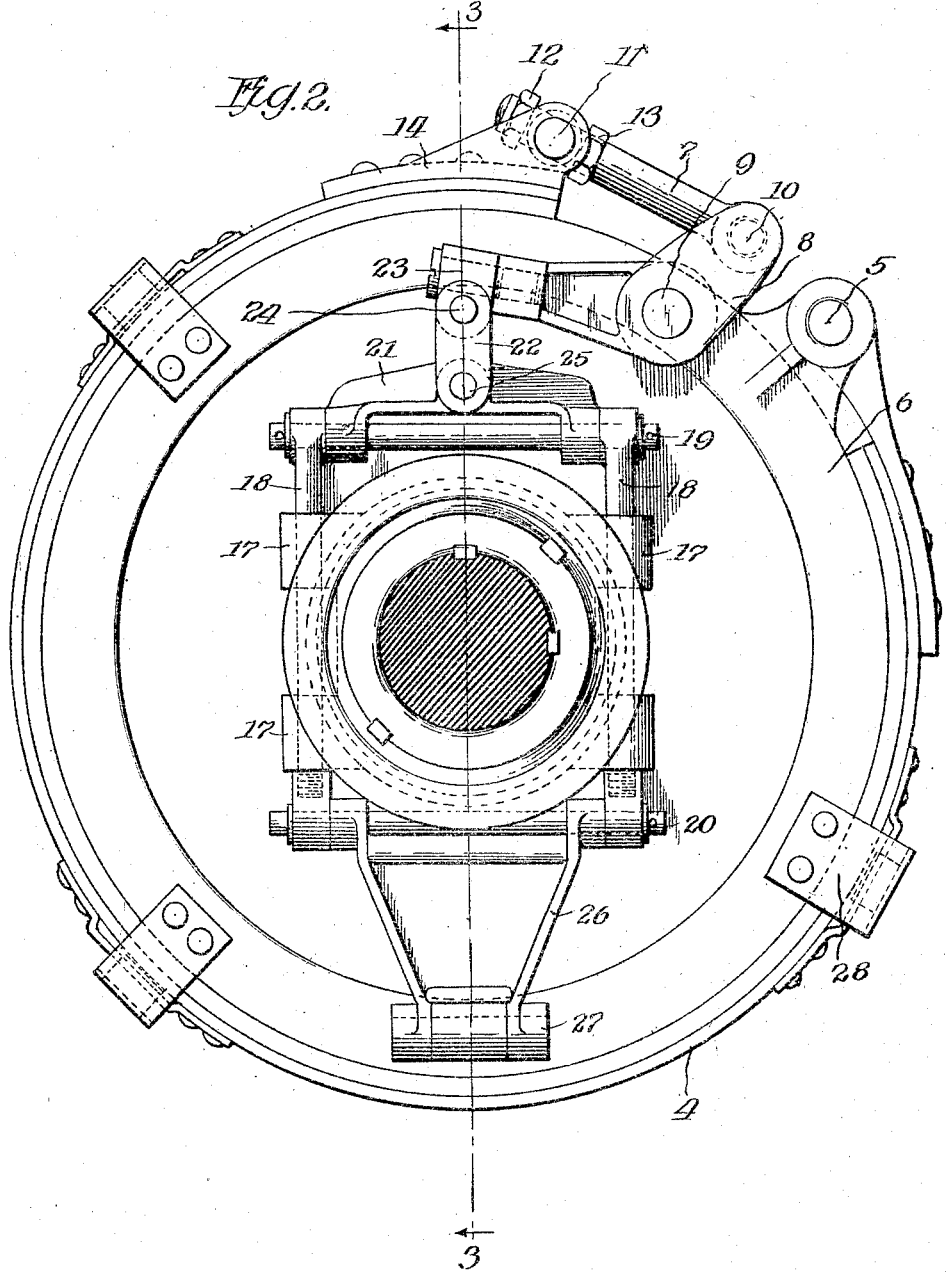

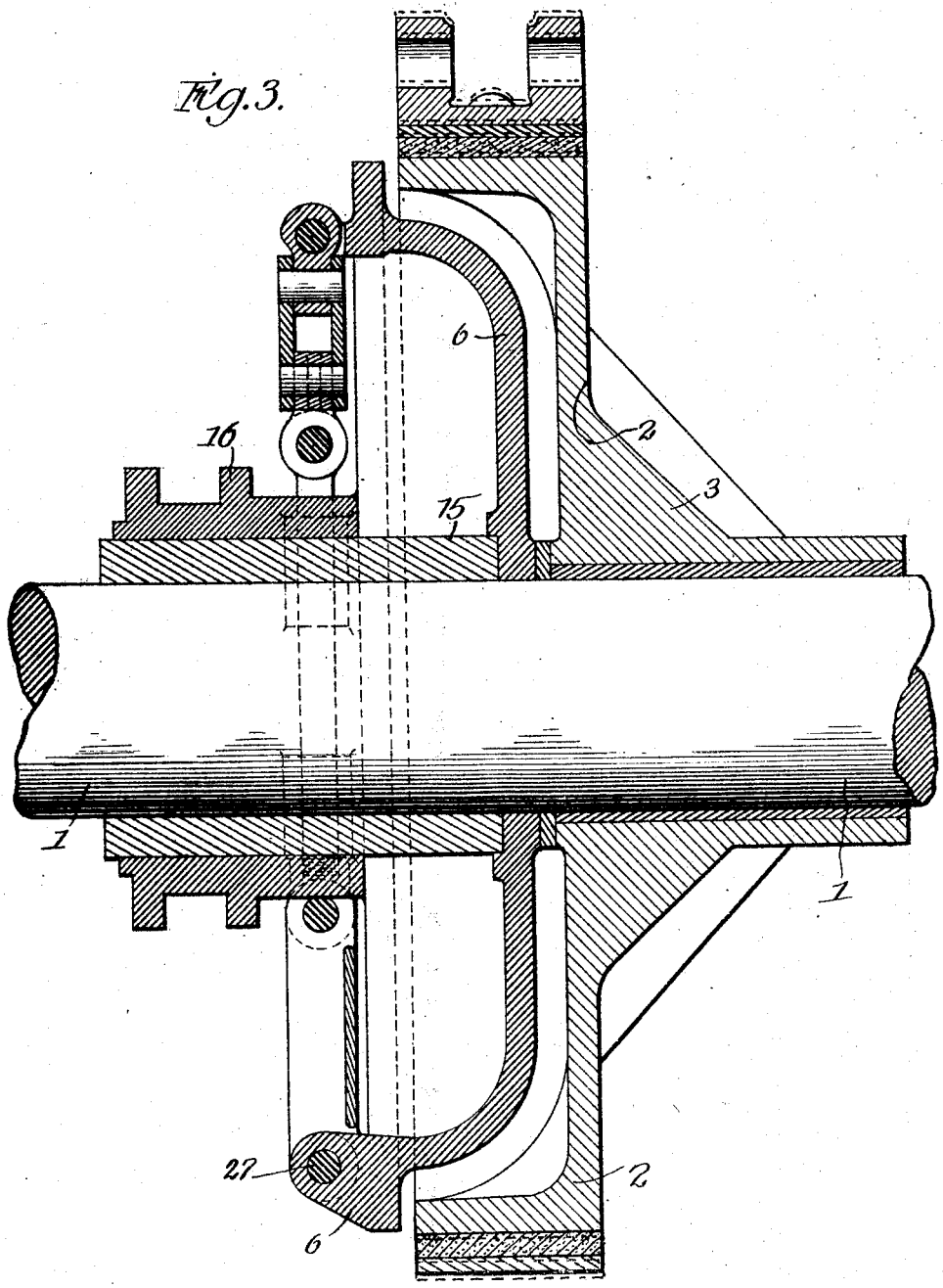

1,556,962

UNITED STATES PATENT OFFICE.

LESLIE A. RUSSELL, OF CHICAGO, ILLINOIS, ASSIGNOR, BY MESNE ASSIGNMENTS, TO F. C. AUSTIN MACHINERY COMPANY, A CORPORATION OF ILLINOIS.

CLUTCH MECHANISM.

Application filed October 22, 1919. Serial No. 332,528.

*To all whom it may concern:*

Be it known that I, LESLIE A. RUSSELL, a citizen of the United States of America, and a resident of Chicago, Illinois, have invented a certain new and useful Improvement in Clutch Mechanism, of which the following is a specification.

This invention relates to clutches, and more particularly to those which are commonly known as friction band clutches, the transmission of power being controlled by a friction band.

Generally stated, the object of the invention is to provide novel and improved mechanism for operating or controlling the said friction band of a clutch of this particular character.

It is also an object to provide certain details and features of construction and combinations tending to increase the general efficiency and the desirability of a friction clutch of this character.

To these and other useful ends the invention consists in matters hereinafter set forth and claimed and shown in the accompanying drawings, in which—

Fig. 2 is a section on line 2—2 in Fig. 1.

Fig. 3 is a vertical section on line 3—3 in Fig. 2.

Figure 1:
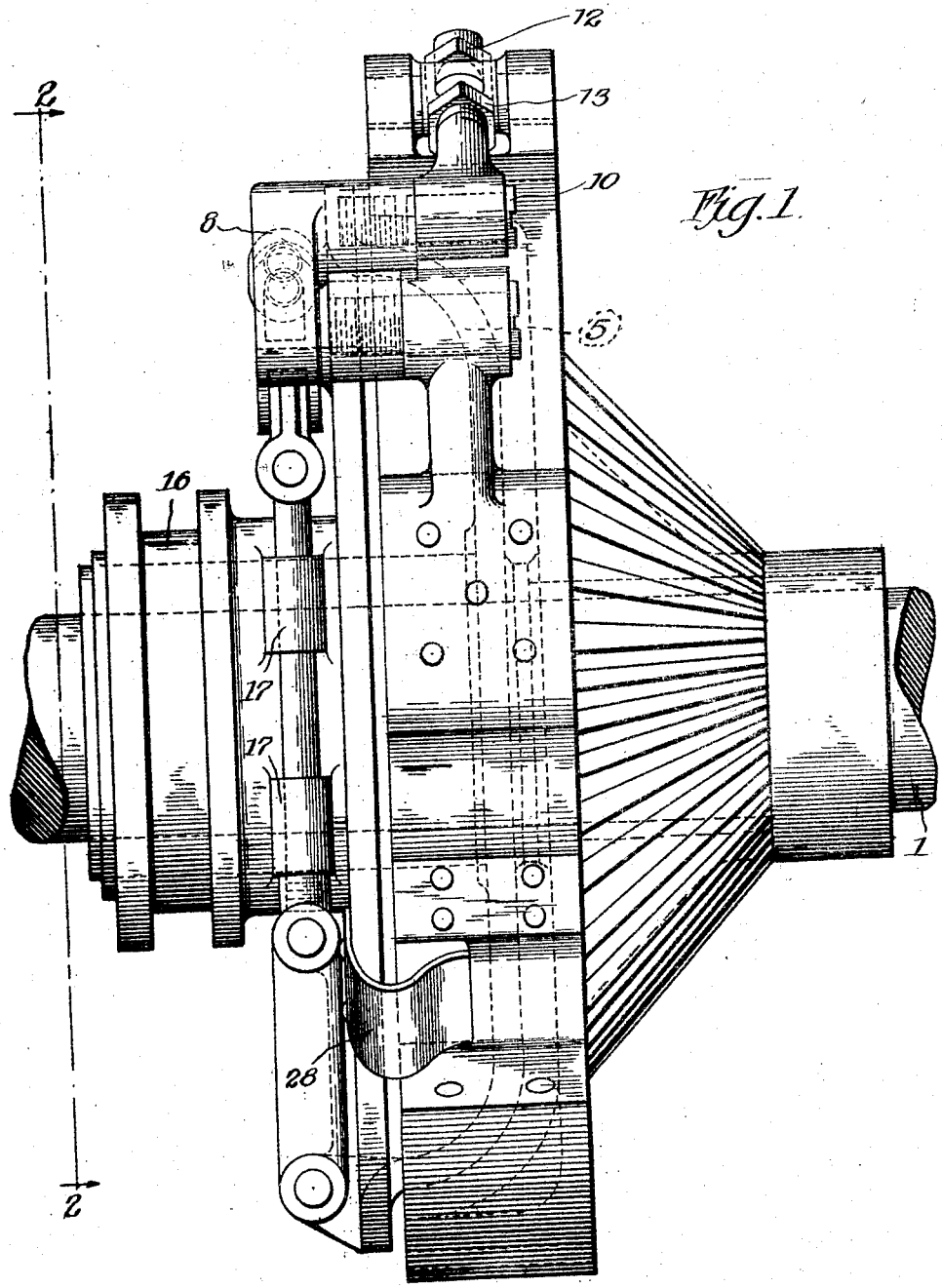
Fig. 1 is a side elevation of a friction band clutch embodying the principles of the invention.

As thus illustrated, the invention comprises a shaft 1 upon which the drum 2 is loosely mounted, in any suitable manner; and, in the embodiment of the invention shown, said drum has a bevel gear 3 on the outer side thereof, so that power may be transmitted either to or from said shaft. The band clutch strap 4 is preferably of steel or other suitable material, and is anchored at 5 at one end, on the clutch member 6, and has its other end connected by the link 7 with the bell crank 8, which latter is pivoted at 9 upon said clutch member 6, the latter being keyed or otherwise secured to said shaft. The link 7 is preferably in the form of a bolt having one end pivoted at 10 on said bell crank, and having its other end inserted through a trunnion 11, and being provided with nuts 12 and 13 to hold it in place, and for adjustment to regulate the action of the clutch band. The trunnion 11 is supported by a bracket 14 which is riveted or otherwise secured, as shown, to one end portion of the band clutch strap. A sleeve 15 is rigidly connected with the clutch member 6, and rotates with the shaft, and the clutch controlling collar 16 slides on said sleeve. This collar is provided at opposite sides with lugs or projections 17 which are bored vertically to provide guides for the vertically disposed rods 18, which latter have their upper and lower ends respectively provided with horizontally disposed connecting pins 19 and 20; but it will be understood, however, that this description is with respect to the positions in which these parts are shown in the drawings, as the collar 16, and therefore the rods 18, rotate with the shaft. A fork 21 is mounted on the rod 19, to turn thereon or therewith, and this fork is connected by a link 22 with the longer arm of the bell crank 8, so that sliding movement of the collar 16 will serve to operate said bell crank. It will be seen that the link 22 is connected to said bell crank by means of a swivel 23, of any suitable character, whereby the link 22 is not only free to swing about its pivot 24 and 25, which form axes extending at right angles to the rod 19, but is also free to swing about the upper axis (formed by the swivel 23) which intersects and extends at right angles to the axis provided by the pivot 9, whereby the shifting of the clutch collar 16 does not produce any binding of the parts. The rod 20 has a fork 26 supported thereon, and the lower end of this fork is pivoted at 27 upon the clutch member 6, the axis provided by the pivot 27 extending horizontally, as the structure is shown in the drawings, and at right angles to the shaft upon which the clutch mechanism is supported. The rods 18, it will be understood, are free to slide up and down in the guides provided by the lugs 17, in a manner that will be readily understood.

It will be understood that the friction clutch strap may be of any suitable, known or approved character. As shown, it is of that well known form in which the clutch strap 4 is connected by springs 28, at intervals in the circumference of the strap, with the rotary clutch member 6, whereby the said strap is suitably supported by that member of the clutch which is keyed to the shaft.

Any suitable means can be employed, of course, for shifting the clutch controlling collar 16 longitudinally of the shaft, thereby to either set or release the clutch strap. As shown, the clutch strap is set, and movement of the collar 16 toward the member 6 (which may be accomplished under normal clutch operating conditions by means of a lever connected by a chuck, or in any preferred manner, with the collar 16) will operate the bell crank 8, through the action of the double toggle element formed by the fork 21, link 22 and fork 26, causing the bell crank to release the clutch strap. When the collar 16 is pulled outwardly, the toggle connections operate the bell crank 8 in a manner that will set the said clutch strap on the member 2, so that the latter will rotate in unison with the shaft and the other elements. As stated, power can be communicated from the shaft 1 to the bevel gear 3, if desired, in which event said shaft will rotate constantly and cause the clutch member 6 to rotate therewith; or, on the other hand, power can be communicated by bevel gearing to the bevel gear 3, causing the latter to operate constantly, and in that event the shaft 1 and the clutch member 6 will be stationary when the clutch is open, and will only rotate when the clutch is closed. With the construction shown and described, which is illustrative of the invention, the pivot 27 takes the entire thrust of the toggle mechanism when the clutch is closed, inasmuch as the rods 18 are free to slide in their guide lugs 17, as previously explained; and, with this arrangement, increased motion is obtained over and above what would be obtained by mounting the rod 19 in bearings on the collar 16; for, as explained, when the clutch-controlling collar 16 is pulled outwardly to set the clutch band, the rods 18 move upwardly, thus raising the toggle joint formed by the pivot pin 19, assuming, of course, that the parts are in the positions shown in Fig. 2; but it will be understood, of course, that the mechanism rotates so that the rods 18 are liable to be horizontal or at an angle when the adjustment occurs, the description being with reference to the positions in which the parts are shown in the drawings.

It will be understood, of course, that the invention is applicable to a band clutch of any suitable or desired character, and may be employed in connection with the type of band clutch shown and described, or with any other well known or suitable form of friction band clutch. The rods 18 and the cross pins or rods 19 and 20 form a yoke which has sliding engagement with the collar 16, which latter is the controller of the clutch.

What I claim as my invention is:

1. Clutch mechanism, comprising a shaft, fixed and loose members on said shaft, a friction clutch band surrounding said loose member, an actuating member connected with one end of said band and pivoted on said fixed member, and toggle mechanism between said actuating member and the fixed part of said fixed member, said mechanism comprising a collar slidable with respect to said shaft, said collar having apertured lugs projecting therefrom, a yoke formed with side rods freely slidable through said lugs, and toggle elements connected with the opposite ends of said rods and connecting said ends respectively to said actuating member and said fixed member, whereby said fixed member takes the thrust of the toggle mechanism when the clutch is closed.

2. In a clutch, the combination of a drum, a clutch strap to engage said drum, a member by which the strap is supported, said member and drum being mounted for relative rotation, a sliding controller having apertured lugs projecting therefrom, a yoke comprising connected rods freely slidable in said lugs, and toggle joints forming connections from the opposite ends of said rods to pivotal points on said member, the clutch strap being operatively connected to said toggle joints and being operated by sliding movement of said rods.

LESLIE A. RUSSELL.